(12) United States Patent
Severson

(10) Patent No.: US 12,252,450 B2
(45) Date of Patent: *Mar. 18, 2025

(54) AQUEOUS AND SOLID AMMONIUM SULFATE FERTILIZERS AND METHODS OF PRODUCING

(71) Applicant: M.A.R.G., LLC., Valparaiso, IN (US)

(72) Inventor: Scott Severson, Valparaiso, IN (US)

(73) Assignee: M.A.R.G., LLC, Valparaiso, IN (US)

( * ) Notice: Subject to any disclaimer, the term of this patent is extended or adjusted under 35 U.S.C. 154(b) by 973 days.

This patent is subject to a terminal disclaimer.

(21) Appl. No.: 17/319,712

(22) Filed: May 13, 2021

(65) Prior Publication Data

US 2021/0269371 A1 Sep. 2, 2021

Related U.S. Application Data

(63) Continuation-in-part of application No. 17/096,533, filed on Nov. 12, 2020, now Pat. No. 11,999,664.
(Continued)

(51) Int. Cl.
*C05C 3/00* (2006.01)
*C05D 3/02* (2006.01)
(Continued)

(52) U.S. Cl.
CPC .................. *C05C 3/00* (2013.01); *C05D 3/02* (2013.01); *C05G 1/00* (2013.01); *C05G 5/20* (2020.02)

(58) Field of Classification Search
CPC .... C05C 3/00; C05G 1/00; C05G 5/20; C05D 3/02
See application file for complete search history.

(56) References Cited

U.S. PATENT DOCUMENTS 1,152,244 A 8/1915 Vis
1,888,922 A * 11/1932 Hartenstein ............. C05F 11/02
71/49
(Continued)

FOREIGN PATENT DOCUMENTS

DE 19547320 A1 * 6/1997 ............... C05C 3/00
FR 2970883 A1 * 8/2012 ............... C05D 3/02

OTHER PUBLICATIONS

Abbas, Khalid K., "Study on The Production of Ammonium Sulfate Fertilizer From Phosphogypsum", Eng. & Tech. Journal, vol. 29, No. 4 (2011), 8 pages.
(Continued)

*Primary Examiner* — Wayne A Langel
(74) *Attorney, Agent, or Firm* — Hartman Global IP Law; Gary M. Hartman; Domenica N.S. Hartman

(57) ABSTRACT

Aqueous and solid ammonium sulfate fertilizers derived from an organic feedstock and a mineral sulfate compound. The aqueous fertilizers have at least 3.5% nitrogen and at least 4% sulfur, and the solid fertilizers have about 21% nitrogen and about 24% sulfur. Methods for producing the fertilizers include preparing an organic feedstock by causing organic waste to undergo anaerobic digestion, removing solids from the organic feedstock to produce an organic liquid effluent, performing a distillation process on the organic liquid effluent to strip and concentrate a vapor that contains ammonia, carbon dioxide, and water and cool the vapor to produce a condensed solution containing ammonium bicarbonate and/or ammonium carbonate, and contacting the condensed solution with the mineral sulfate compound to cause a reaction therebetween and produce an aqueous ammonium sulfate product. An evaporation process can be performed on the aqueous ammonium sulfate product to produce a dry, solid ammonium sulfate product.

20 Claims, 4 Drawing Sheets

Related U.S. Application Data

(60) Provisional application No. 62/934,279, filed on Nov. 12, 2019.

(51) Int. Cl.
*C05G 1/00* (2006.01)
*C05G 5/20* (2020.01)

(56) References Cited

U.S. PATENT DOCUMENTS

| | | | |
|---|---|---|---|
| 2,788,269 | A | 4/1957 | Burwell et al. |
| 4,239,522 | A * | 12/1980 | Wilson ............... C05C 1/00 71/30 |
| 5,616,163 | A * | 4/1997 | Halfter ............... C05C 3/00 71/15 |
| 8,758,719 | B2 | 6/2014 | Hasinoff et al. |
| 9,193,601 | B2 | 11/2015 | Ghosh et al. |
| 10,023,501 | B2 | 7/2018 | Bisson et al. |
| 10,556,837 | B2 | 2/2020 | Love et al. |
| 11,999,664 | B2 * | 6/2024 | Severson ............... C05F 5/002 |
| 2016/0046964 | A1 | 2/2016 | Ward |
| 2019/0071338 | A1 | 3/2019 | Bassani et al. |
| 2020/0140348 | A1 | 5/2020 | Love et al. |
| 2021/0101845 | A1* | 4/2021 | Love ............... C05C 11/00 |
| 2022/0380270 | A1* | 12/2022 | Stemwedel ............... C05G 5/23 |

OTHER PUBLICATIONS

Albarelli, G. "Revisiting the Merseburg Process: Economic Opportunity and Environmental Benefit?", ECI Digital Archives, Beneficiation of Phosphates VIII, Proceedings, May 3, 2018, http://dc.engconfintl.org/phosphates_viii, 28 pages.
Amin, MD. Ruhul, "A Study of Process Parameters for Producing Ammonium Sulfate Utilizing By-Product Gypsum", A Thesis Submitted to the Department of Chemical Engineering, Bangladesh University of Engineering and Technology, BUET, Dhaka Bangladesh, Apr. 1999, 50 pages.
Besterekov, U. et al., "Complex Mineral Fertilizers: Opportunities of Manufacturing Them from Technogenic Wastes", Oriental Journal of Chemistry, vol. 33, No. 1 (2017), pp. 92-103.
Cheng, T. et al., "Transformation and Removal of Ammonium Sulfate Aerosols and Ammonia Slip from Selective Catalytic Reduction in Wet Flue Gas Desulfurization System", Elsevier, Journal of Environmental Sciences 88 (2020), pp. 72-80.
Costamagna, P. et al., "Process of Ammonia Removal from Anaerobic Digestion and Associated Ammonium Sulphate Production: Pilot Plant Demonstration", Elsevier, Journal of Environmental Management 259 (2020) 109841, pp. 1-8.
Costamagna, P. et al., "System for Ammonia Removal from Anaearobic Digestion and Associated Ammonium Sulfate Production: Stimulation and Design Considerations", Elsevier, Process Safety and Environmental Protection 144 (2020) pp. 133-142.
Danielik, V. et al., "Kinetics of the Conversion Reaction of Gypsum and Ammonium Carbonate", Springer, Chemical Papers (2018) 72, pp. 2631-2639.
Govindan, M. et al., "Effective Identification of (NH4)2C03 and NH4HC03 Concentrations in NaHC03 Regeneration Process from Desulfurized Waste", Elsevier, Talanta 132 (2015) pp. 327-333.
Hanif, M.A. et al., "Sulfur Dioxide Removal: An Overview of Regenerative Flue Gas Desulfurization and Factors Affecting Desulfurization Capacity and Sorbent Regeneration", Environmental Science and Pollution Research (2020) pp. 27515-27540.
Jurisova, J. et al., "Reactivity of Calcium Carbonate Prepared from Flue Gas Desulfurization Gypsum", Acta Chimica Slovaca, vol. 12, No. 1, (2019) pp. 14-21.
Kandil, Abdel-Hakim T. et al., "Ammonium Sulfate Preparation from Phosphogypsum Waste", Elseivier, Journal of Radiation Research and Applied Sciences 10, (2017) pp. 24-33.
Lee, M. et al., "Mineral Carbonation of Flue Gas Desulfurization Gypsum for C02 Sequestration", Elsevier, Energy 47 (2012) pp. 370-377.
Liu, D. et al., "A Comparative Study on the Design of Direct Contact Condenser for Air and Oxy-Fuel Combustion Flue Gas Based on Callide Oxy-Fuel Project", Elsevier, International Journal of Greenhouse Gas Control 75 (2018) pp. 74-84.
Mahood, H.B. et al., "Experimental Measurements and Theoretical Prediction for the Transient Characteristic of a Two-Phase Two-Component Direct Contact Condenser", Elsevier, Applied Thermal Engineering 87 (2015) pp. 161-174.
Mahood, H.B. et al., "Heat Transfer Measurements in a Three-Phase Direct-Contact Condenser Under Flooding Contitions", Elsevier, Applied Thermal Engineering 95, (2016) pp. 106-114.
Masi, F. et al., "Upflow Anaerobic Sludge Blanket and Aerated Constructed Wetlands for Swine Wastewater Treatment: A Pilot Study", IWA Publishing 2017, Water Science & Technology 76.1 (2017) pp. 68-78.
Mattila H.P. et al., "Mineral Carbonation of Phosphogypsum Waste for Production of Useful Carbonate and Sulfate Salts", Frontiers in Energy Research, (2015) vol. 3, Article 48, pp. 1-8.
Milella F. et al. "Estimation of the Growth and Dissolution Kinetics of Ammonium Bicarbonate in Aqueous Ammonia Solutions from Batch Crystallization Experiments. 2. The Effect of Sulfate Impurity", Cryst. Growth Des. (2020), 20, pp. 948-963.
Polasek, J.C., "Influence of Ammonia on Gas Sweetening Units Using Amine Solutions", Bryan Research and Engineering, Inc.—ProQuest Document Link, Technical Papers, Copyright 2006, pp. 1-17.
Song, K., et al. "Precipitation of Calcium Carbonate During Direct Aqueous Carbonation of Flue Gas Desulfurization Gypsum", Chemical Engineering Journal 213 (2012) pp. 251-258.
Swift, W.M., et al. "Decomposition of Calcium Sulfate: A Review of The Literature", Argonne National Laboratory, Argonne, Illinois, Prepared for the U.S. Energy Research and Development Administration Under Contract W-31-109-Eng-38., 64 pages.
Thakare, V.B., "Ammonium Sulfate", (M. Tech, Chemical SVNIT, Surat)—Assistant Professor, Parul University—Vadodara, 7 pages.
Wang, J., et al., "Measurement of Physical Properties and Correlation of the Solubility of Calcium Carbonate in Ammonium Sulfate Aqueous Solution at T=(298.15, 323.15, and 348.15) K in the Process of Preparing Calcium Carbonate Products by the Desulfurization of Gypsum", J. Chem. Eng. Data 61, (2016), pp. 3827-3833.
Wang, L. "Cobalt Impregnated Porous Catalyst Promoting Ammonium Sulfate Recovery in an Ammonia-Based Desulfurization Process", Chemical Engineering Journal 331 (2018) pp. 416-424.
Xue, B. et al., "An Investigation of the Effect of Ammonium Sulfate Addition on Compound Fertilizer Granulation", Elsevier, Particuology 31 (2017) pp. 54-58.
Yadavalli, G. et al., "Carbon Dioxide Capture Using Ammonium Sulfate Surface Modified Activated Biomass Carbon", Elsevier, Biomass and Bioenergy, 98 (2017) pp. 53-60.
"Sulphur is the Key", Ammonum Sulphate—Nitrogen & Methanol No. 240, Jul./Aug. 1999. 3 pages.

* cited by examiner

AQUEOUS AND SOLID AMMONIUM SULFATE FERTILIZERS AND METHODS OF PRODUCING

CROSS REFERENCE TO RELATED APPLICATIONS

This is a continuation-in-part patent application of U.S. patent application Ser. No. 17/096,533, filed Nov. 12, 2020, which claims the benefit of U.S. Provisional Application No. 62/934,279 filed Nov. 12, 2019. The contents of these prior applications are incorporated herein by reference.

BACKGROUND OF THE INVENTION

The present invention generally relates to fertilizers and systems and processes capable of producing such fertilizers, and in particular organic ammonium sulfate fertilizers from an effluent derived from one or more organic sources.

High yields and healthy growth in food crops, gardens, and lawns require a high soil nitrogen content. High ammoniacal nitrogen fertilizers are commonly used to meet this need by delivering the necessary nitrogen directly to soil and crops. However, most high ammoniacal nitrogen fertilizers currently available are synthetic fertilizers which precludes them from being used to produce organic crops, one of the fastest-growing sectors of the agricultural economy. In the United States, organic crops are regulated by the National Organic Program (NOP) standards developed under the Organic Foods Production Act of 1990 (7 C.F.R. § 205), and the term "organic crops" is used herein consistent with the NOP standards. By 2031, the demand for organic fertilizer with high nitrogen content is predicted to increase tenfold in the United States. Currently, very few companies offer an organic fertilizer that meets these needs.

Organic crops, specifically berries and legumes, require significant amounts of sulfur in order to be healthy. Sulfur promotes protein development in plants and enables plants to more efficiently utilize other nutrients. Sulfur has previously been considered a "secondary nutrient" in fertilizers, whereas nitrogen, phosphorus, and potassium have previously been considered "primary nutrients." However, recent trends have led some growers to refer to sulfur as a "fourth macronutrient" (i.e., a primary nutrient). This change is related to the fact that improving environmental stewardship in the United States has reduced the incidence of acid rain, previously a means through which some crops have received sulfur. Synthetic crops generally receive sulfur from synthetic ammonium sulfate fertilizers which provide both nitrogen and sulfur in the form of an ammonium sulfate compound. Currently, no known companies produce an ammonium sulfate fertilizer with the potential to be certified organic. Therefore, most organic crops receive sulfur from the application of composted manure which is inefficient compared to the effectiveness of ammonium sulfate products.

In view of the above, it can be appreciated that it would be desirable if products were available providing benefits associated with ammonium sulfate fertilizers that is produced in accordance with the standards of the National Organic Program and therefore suitable for use as inputs for organic crops.

BRIEF DESCRIPTION OF THE INVENTION

The present invention provides ammonium sulfate fertilizers derived from organic sources with significantly higher nitrogen and sulfur levels than other previously existing fertilizers produced from organic sources.

According to one aspect of the invention, an aqueous ammonium sulfate fertilizer is provided having at least 3.5% nitrogen and at least 4% sulfur, and derived from an organic feedstock and a mineral sulfate compound.

According to another aspect of the invention, a solid ammonium sulfate fertilizer is provided containing about 21% nitrogen and about 24% sulfur, and derived from an organic feedstock and a mineral sulfate compound.

Other aspects of the invention include methods for producing the aqueous and solid ammonium sulfate fertilizers noted-above with processes that include the steps of preparing an organic feedstock that contains at least one nitrogen compound by causing organic animal manure and/or organic food waste to undergo anaerobic digestion, removing solids from the organic feedstock to produce an organic liquid effluent that contains at least one of ammonium and ammonia, performing a distillation process on the organic liquid effluent to strip and concentrate a vapor mixture therefrom that contains ammonia, carbon dioxide, and water and cool the vapor mixture to produce a condensed solution containing ammonium bicarbonate and/or ammonium carbonate, contacting the condensed solution with the mineral sulfate compound to cause a reaction therebetween and produce an aqueous ammonium sulfate product, and for the solid ammonium sulfate fertilizers, performing an evaporation process on the aqueous ammonium sulfate product to remove water therefrom and produce a dry, solid ammonium sulfate product.

Technical effects of the fertilizers described above preferably include the ability to more efficiently provide sulfur to organic crops.

Other aspects and advantages of this invention will be appreciated from the following detailed description.

DETAILED DESCRIPTION OF THE INVENTION

Figure 1:
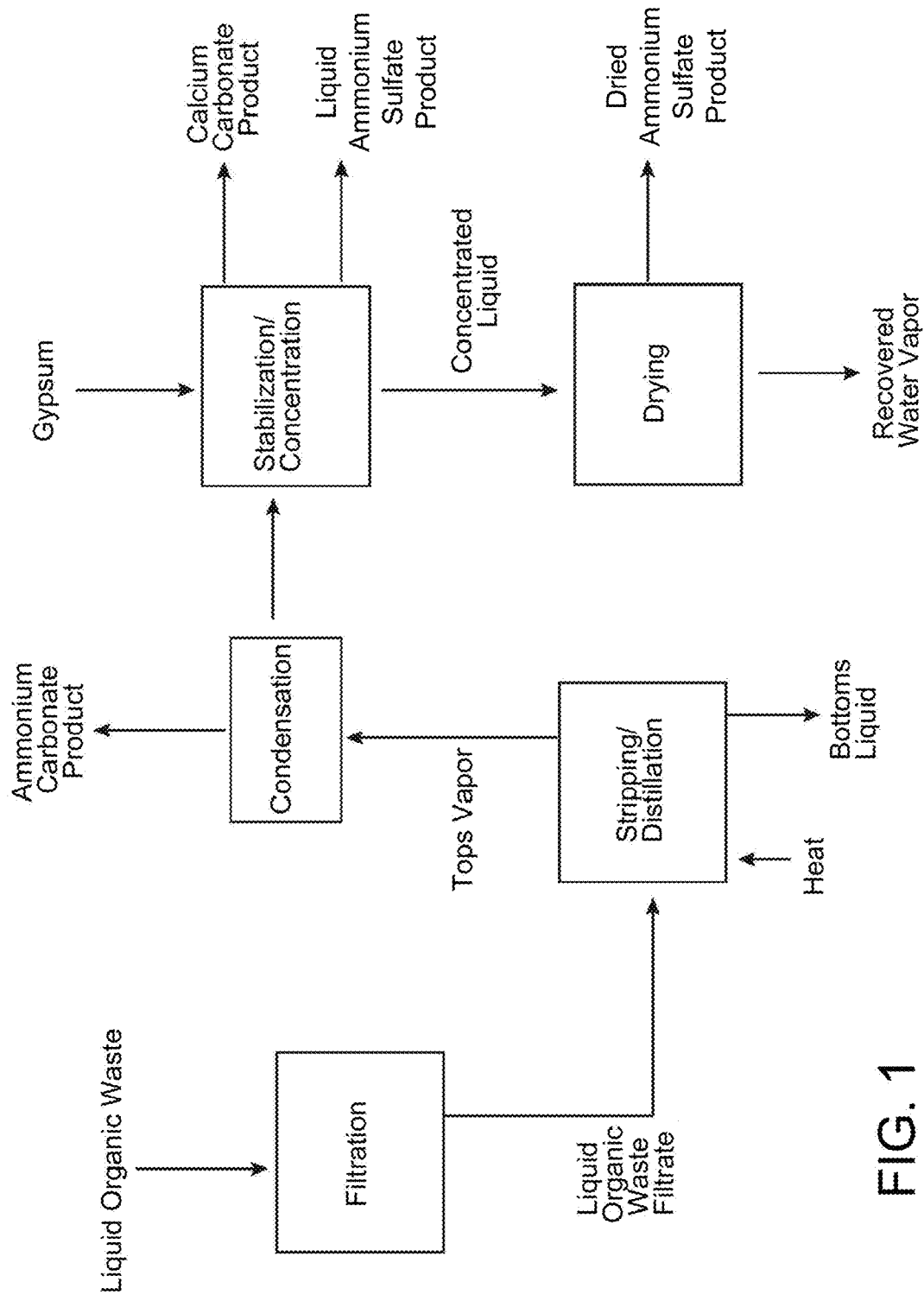
FIG. 1 schematically represents a process of producing liquid and dry ammonium sulfate products derived from organic sources in accordance with certain nonlimiting aspects of the invention.

The following disclosure describes various aspects of systems and processes that are schematically represented in FIGS. 1 through 4 which are suitable for producing organic ammonium sulfate fertilizers. Although the invention will be described hereinafter in reference to particular features/functions schematically identified in the drawings, it should be noted that the teachings of the invention are not limited to these particular features/functions, and the invention does not require all of the features/functions or the interfunctionality represented in the drawings.

FIG. 1 schematically represents general steps that may be included in systems and processes for producing one or more products, including but not limited to an organic, liquid ammonium sulfate fertilizer. For convenience, the processing steps will be described as being organized into three sections that include a pretreatment section, a distillation section, and a product section. However, this should not be interpreted as limiting the scope of the invention as the processes could include additional or fewer steps, and/or the represented steps may be characterized differently and/or include additional or fewer components.

In FIG. 1, the pretreatment section involves the processing of an organic feedstock, referred to in FIG. 1 as a liquid organic waste, to yield a liquid organic waste filtrate (sometimes referred to herein as an "organic liquid effluent" or simply "effluent") that contains ammonium ($NH_4^+$), or ammonia ($NH_3$), or both ammonium and ammonia. In the example given, solids are removed from the organic feedstock by filtration to produce the liquid organic waste filtrate. In the distillation section, the liquid organic waste filtrate undergoes a distillation process that includes stripping from the liquid organic waste filtrate a vapor mixture ("Tops Vapor") that contains ammonia, carbon dioxide ($CO_2$), and water. The vapor mixture is concentrated and then cooled and condensed to produce a condensed aqueous solution containing ammonium bicarbonate (($NH_4$)$HCO_3$) and/or ammonium carbonate (($NH_4$)$_2CO_3$). An ammonium bicarbonate product and/or ammonium carbonate product produced during the distillation process may be collected and removed in this section. In the product section, the condensed aqueous ammonium carbonate/bicarbonate solution is contacted with a stabilizing agent, which in the nonlimiting embodiment of FIG. 1 is represented as gypsum, to stabilize and concentrate stabilized products resulting from a reaction between the condensed liquid and the gypsum. The stabilized products are identified in FIG. 1 as a calcium carbonate product and a concentrated liquid ammonium sulfate product. Optionally, the concentrated liquid ammonium sulfate product may be dried to produce a dry ammonium sulfate product, such as ammonium sulfate fertilizer, and a recovered water vapor.

The term "stabilized" as used in reference to stabilized products refers to products that are not and do not contain gaseous ammonia, which would be objectionable for safety and environmental reasons, and instead the ammonia and nitrogen are contained in a stable compounds, such as a stabilized ammonium sulfate compound. The stabilized products produced in the process of FIG. 1 are preferably "organic products," which as used herein refer to products that are produced in accordance with the standards of the National Organic Program (NOP) developed under the Organic Foods Production Act of 1990 (7 C.F.R. § 205) such that the products can be approved for use as an input in organic crop production. Organic products can also refer to products and fertilizers approved by third party organic certifying agencies using similar guidelines to the National Organic Program. As an example, an organic, stabilized ammonium sulfate product (e.g., ammonium sulfate fertilizer) as used herein refers to an ammonium sulfate product produced in accordance with the NOP standards with the potential to be approved for use in organic crop production and does not contain gaseous ammonia.

In view of the desire to produce organic products, it should be understood that the terms "organic feedstock" or "organically derived feedstock" refer to entirely natural source materials having containing ammoniacal nitrogen from which the liquid organic waste filtrate (effluent) used herein is produced. The term "ammoniacal nitrogen" will be used herein to refer to nitrogen that is contained in ammonium, and preferably can be provided to a plant in a water-soluble form that is readily available to the plant for use as a nutrient. These natural source materials may include, but are not limited to, animal manure (including cattle manure effluent and hog manure effluent), organic food waste, blood meal, feather meal, guano, bone meal, and wastewater from a variety of food and liquid processing operations. The organic feedstock is preferably anaerobically digested to remove pathogens and convert organic matter into ammoniacal nitrogen. As known in the art, anaerobic digestion is a collection of processes by which microorganisms break down biodegradable material (biomass) within a digester and in the absence of oxygen. Within a digester, various types of bacteria may be used to break down the biomass into byproducts including biogas (e.g., methane, carbon dioxide, etc.) and a liquid effluent, commonly referred to as digestate. Although synthetic substances may not necessarily inhibit or have a significant effect on the processes disclosed herein or their ability to produce high nitrogen fertilizers, to achieve organic certification under the National Organic Program standards, the feedstock is preferably digested while avoiding any contact with any synthetic substances or materials, such as polymers that are commonly used in certain solid separation processes for animal manure affluent. Effluents produced from these feedstocks and processed as described herein preferably do not contain any suspended solids greater than 15 microns, and preferably have a total suspended solids (TSS) of about 2.5% or less.

Also consistent with the desire to produce organic products, additives used in the process represented in FIG. 1 are also preferably organic products. As such, the gypsum (calcium sulfate dihydrate; a mineral containing calcium, sulfur, oxygen, and water in the form of $CaSO_4 \cdot 2H_2O$) used in FIG. 1 is preferably certified as derived from an organic source under relevant organic certifying institutions' standards relating to organic crop inputs. For example, it is believed that only mined gypsum may be used in the process in order for the resulting ammonium sulfate product to be an organic product. As such, the processes disclosed herein preferably only use mined mineral gypsum. Other mined mineral compounds containing sulfate such as Epsom salt (magnesium sulfate) may be used in addition to or as an alternative to gypsum. Therefore, the use of the terms "natural sources" and "organic sources" herein refer to both the additives and the liquid organic waste filtrate.

Figure 2:
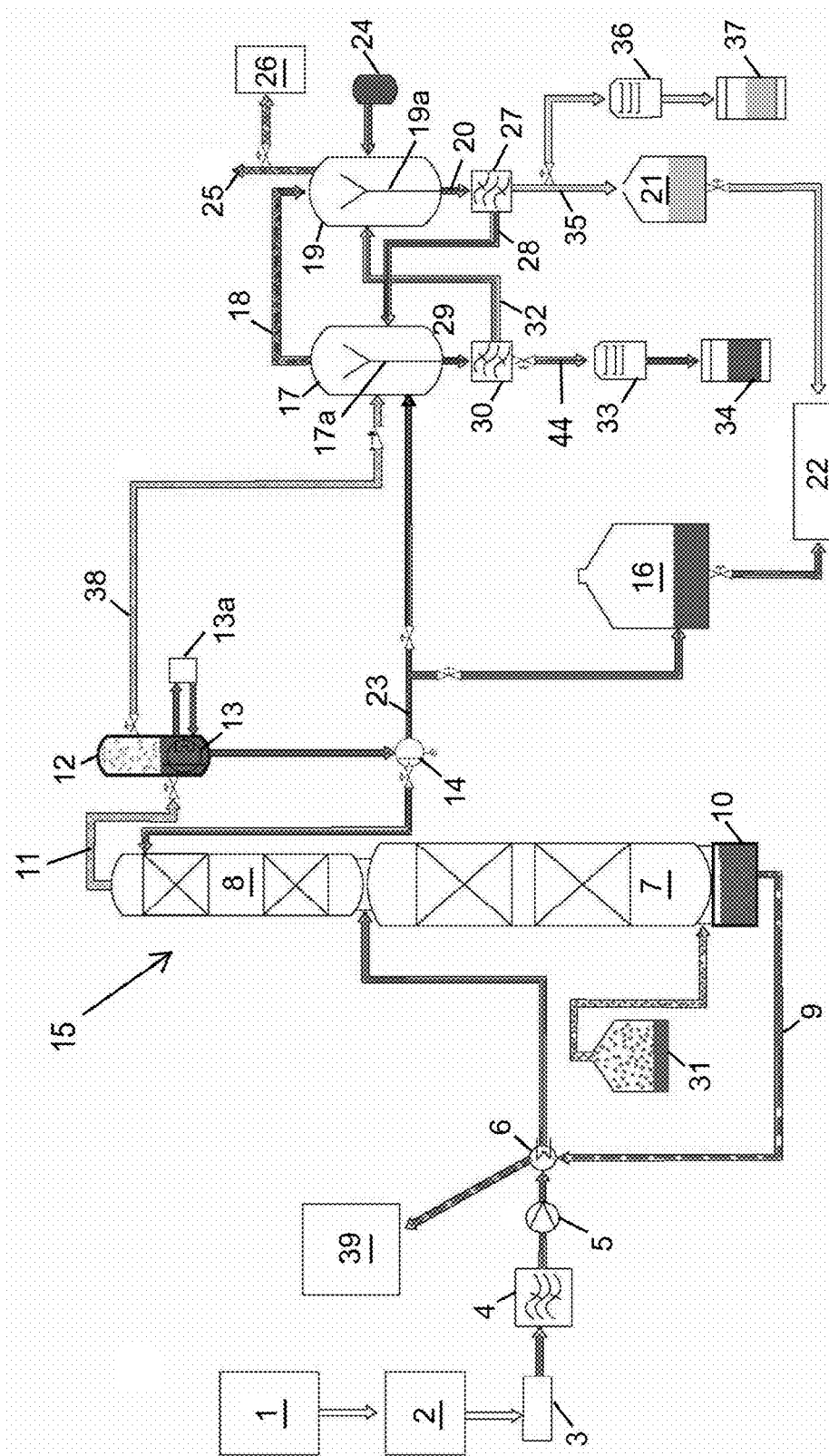
FIG. 2 schematically represents a nonlimiting embodiment of a system for producing an organic stabilized ammonium sulfate product in accordance with certain nonlimiting aspects of the invention.

FIG. 2 schematically represents a nonlimiting embodiment of a system and process for producing an organic stabilized ammonium sulfate product capable of high ammoniacal nitrogen and sulfur contents. In this embodiment, organic waste material is sourced from an animal feedlot 1 and processed in an anaerobic digester 2 to produce a digestate. The digester 2 may be a component of the system represented in FIG. 2 or the digestate produced therefrom may be delivered from a remote operation comprising the digester 2. Alternatively, a lagoon storage may be used instead of the digester 2.

Suspended solids are preferably removed from the digestate, for example, to produce an effluent having the aforementioned maximum suspended solids particles size of not greater than 15 microns and a total suspended solids (TSS) of about 2.5% or less. In FIG. 2, the equipment represented for removing solids from the digestate include a centrifuge 3 and filter unit 4, for example, a fiber press, a screen, or ultrafiltration equipment, though time and gravity in a lagoon may by itself be adequate. A combination of two or more filtration methods is preferred to ensure adequate solids removal. The resulting effluent is likely to be at a temperature of about 100° F. (about 35° C.) and may contain about 1800 ppm ammonium, ammonia, and other forms of nitrogen, as well as hydrogen sulfide ($H_2S$), carbon dioxide, other volatile organics, and certain levels of calcium, iron, magnesium, sodium, potassium, phosphorus, manganese, etc.

The effluent is generally the product of a pretreatment section of the system of FIG. 2, and is transferred with a pump 5 to a distillation tower 15 that forms part of a distillation section of the system. The effluent is preferably at an elevated temperature when it is enters the distillation tower 15. For this reason, a heat exchanger 6 may be used to raise the temperature of the effluent to over 90° F. (about 30° C.), for example at least 180° F. (about 80° C.), and more preferably in the range of 180° F. to 200° F. (80° C. to 95° C.).

The distillation tower 15 is preferably a packed media column, although other distillation methods such as sieve trays may be used. Within the distillation tower 15, the heated effluent enters a stripping section 7 configured to strip and remove ammonia from the effluent. In the nonlimiting embodiment represented in FIG. 2, a boiler 31 is used to generate steam for this purpose. The steam is preferably at a pressure of least 15 psi (about 100 kPa) and at least 250° F. (120° C.). The ammonia is removed from the effluent by provoking the effluent to cover the packed media, which causes gaseous ammonia to pass through the packed media and escape the effluent. The gaseous ammonia is concentrated in a concentration section 8 of the distillation tower 15 located above the stripping section 7 before exiting the tower 15 through a conduit 11 at the top of the tower 15.

The gaseous ammonia is entrained in a vapor mixture (Tops Vapor in FIG. 1) that also contains carbon dioxide gas and water vapor, and may further include hydrogen sulfide and other volatile compounds. The vapor mixture is preferably at a temperature of between 150° to 212° F. (35° C. to 100° C.), more preferably 180° to 200° F. (80° C. to 95° C.), most preferably about 190° F. (90° C.). The vapor mixture preferably has an ammonia concentration above 10%, more preferably above 12%, and most preferably above 15%.

The vapor mixture is conducted to a condenser 12 where the vapor mixture is condensed to yield a condensed aqueous solution that contains aqueous ammonia, ammonium bicarbonate, and/or ammonium carbonate. The condenser 12 is represented in FIG. 2 as a reflux condensing loop having a cooling coil 13 fed with water, air, or glycol coolant 13a. Though represented as external of the tower 15, condensers incorporated into the top of the tower 15 are also foreseeable. In the embodiment shown, the condenser 12 is configured to recycle a portion of the condensed aqueous ammoniacal nitrogen solution back to the tower 15 through a pump 14 to raise the concentration of ammonia within the concentration section 8 to increase the efficiency of ammonia removal from the effluent. The tower 15 is preferably operated at an ammonia removal efficiency of at least 80%, more preferably 90%, and most preferably 95% or more.

The tower 15 also releases a liquid mixture 9 (bottoms liquid in FIG. 1) that includes, without limitation, condensed steam and heated effluent. The heated liquid mixture 9 exits through a tank 10 located at a lower end of the tower 15 and passes through the heat exchanger 6 to transfer heat to the effluent entering the system. After the heat exchanger 6, the liquid mixture 9 may be removed to a lagoon 39 for storage, for example, if the system is constructed at a Confined Animal Feeding Operation or other operation that has use of the liquid mixture 9.

The distillation tower 15 is preferably constructed to maintain organic process controls as defined by the National Organic Program and/or other relevant institutions. This includes, without limitation, the total absence of synthetic substances in areas that come into contact with the effluent and product as well as precautions to ensure that potential spills or leaks cannot introduce synthetic materials to the system. Additionally, organic process controls are preferably applied to the maintenance, operation, and sanitation of the equipment. Automation may also be used in the system to efficiently regulate the temperature and pressure inside the system.

A fraction of the vapor mixture that enters the condenser 12 and a fraction of the condensed aqueous solution condensed within the condenser 12 are shown in FIG. 2 as being separately transported to a product section of the system, and particularly to a water bath within a tank 17 that contains water and dissolved gypsum, which serves to stabilize the ammonium in the vapor mixture and allows ammonium in the condensed aqueous solution to remain in a liquid form as ammonium carbonate and/or ammonium bicarbonate when mixed with water. The tank 17 facilitates a reaction between the gypsum and the ammonium bicarbonate/carbonate, which as shown in Equations 1 and 2 produces calcium carbonate ($CaCO_3$) and a stabilized ammonium sulfate (($NH_4$)$_2SO_4$) product. In certain embodiments, the vapor mixture exiting the condenser 12 may be condensed before entering the water bath. In such an embodiment, the vapor mixture takes the form of a liquid ammonium carbonate solution when it enters the water bath.

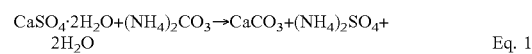

$$CaSO_4 \cdot 2H_2O + (NH_4)_2CO_3 \rightarrow CaCO_3 + (NH_4)_2SO_4 + 2H_2O \qquad \text{Eq. 1}$$

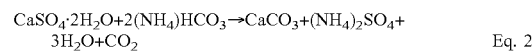

$$CaSO_4 \cdot 2H_2O + 2(NH_4)HCO_3 \rightarrow CaCO_3 + (NH_4)_2SO_4 + 3H_2O + CO_2 \qquad \text{Eq. 2}$$

Figure 3:
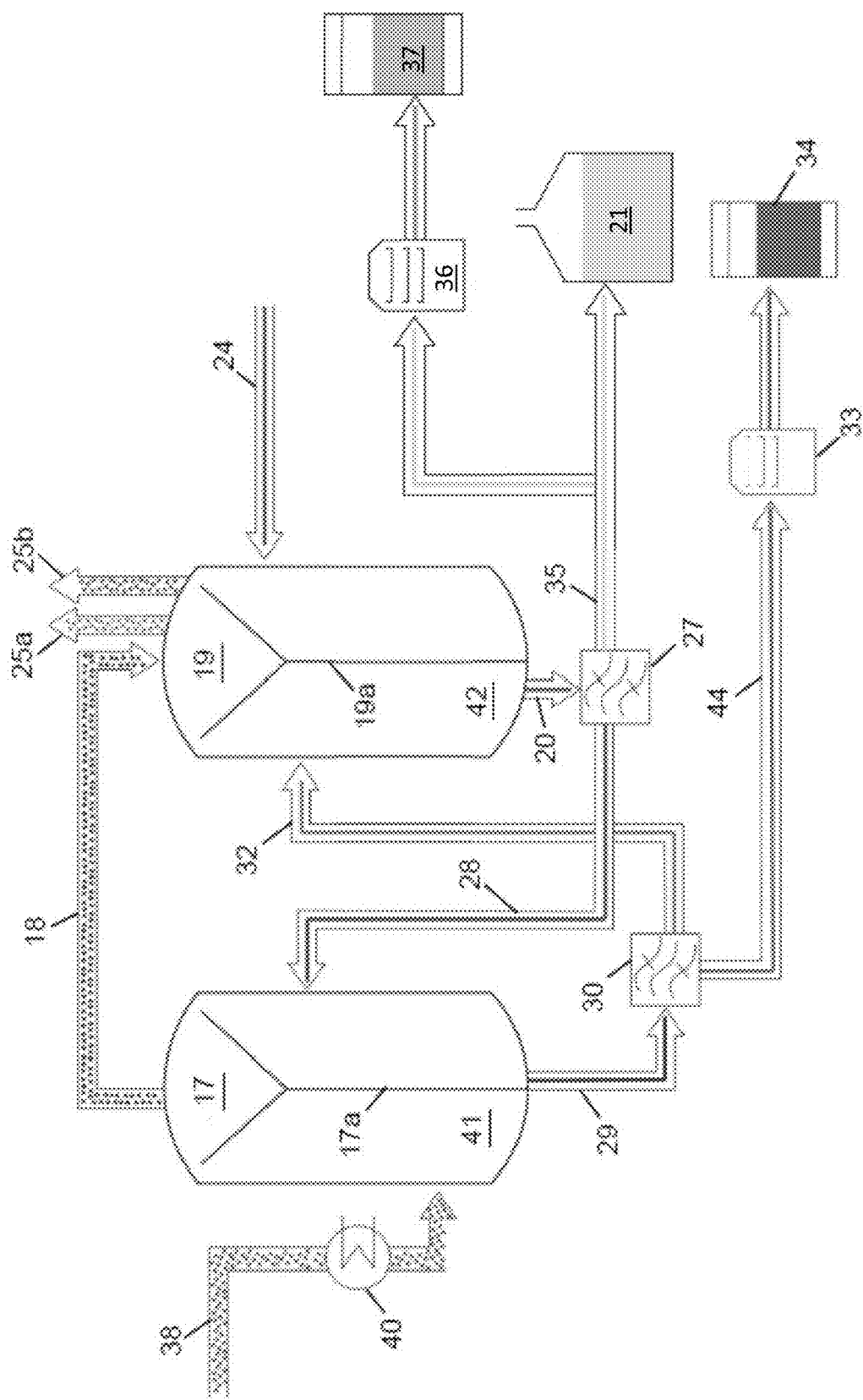
FIG. 3 schematically represents an isolated view of a product section of the system of FIG. 2.

FIG. 3 represents an isolated view of the product section of the system of FIG. 2. As seen in FIGS. 2 and 3, the vapor mixture drawn from the condenser 12 is transported through a conduit 38 and then a heat exchanger 40 into the water bath of the tank 17. The concentration of ammonia in the vapor mixture at this point in the system preferably does not exceed 18% by weight. As represented, the system includes at least a second tank 19 connected to the first tank 17. Each tank 17 and 19 is preferably pressurized and contains a mechanical mixing mechanism 17a and 19a to mix the gypsum with the dissolved ammonium carbonate of the condensed aqueous solution (collectively referenced by 41 and 42 in tanks 17 and 19, respectively) inside the tanks 17 and 19.

The first tank 17 contains a relatively small amount of gypsum, which quickly reacts with the ammonium carbonate in the condensed aqueous solution. The first tank 17 also includes a small amount of ammonium sulfate and a small amount of calcium carbonate as a result of the reaction of Equation 1. The calcium carbonate formed in the tank 17 exits the tank 17 via a circulation stream 29 from which the calcium carbonate is removed with a filter 30. The resulting filtered calcium carbonate stream 44 is dried with a dryer/evaporator 33 to produce dried cakes thereof to be stored in a storage vessel 34. A filtrate slurry 32 containing the remaining ammonium carbonate/bicarbonate and ammonium sulfate originally in the circulation stream 29 enters the second tank 19, which contains a higher concentration of gypsum than the tank 17 as a result of gypsum being directly added to the tank 19 from a gypsum source 24. In addition, excess gases 18 from the first tank 17 may be diverted to the second tank 19.

Within the second tank 19, the gypsum reacts quickly with the ammonium carbonate, so that the reaction products within the tank 19 are primarily ammonium sulfate and calcium carbonate. The resulting slurry stream 20 containing ammonium sulfate and calcium carbonate exits the tank 19, and a stabilized product 35 (primarily an ammonium sulfate solution) is removed from the slurry stream 20 with a filter 27 before being sent to concentration stages of the process. In FIGS. 2 and 3, the stabilized product 35 may be transported to a liquid storage tank 21 or further dried with a dryer/evaporator 36 to produce solid ammonium sulfate crystals and stored in storage vessel 37. A slurry 28 containing gypsum, calcium carbonate, and ammonium sulfate is also shown as being drawn from the second tank 19 and transported to the first tank 17 to be used in the reactions that occur there. Excess gases 25 such as carbon dioxide ($CO_2$) 25a and hydrogen sulfide ($H_2S$) 25b may be removed from the second tank 19. Optionally, a production system 26 may be included to produce iron sulfide from the excess gases 25. The stabilized product 35 collected in the tank 21 may be packaged as a liquid ammonium sulfate solution fertilizer 22. Alternatively or in addition, a fraction of the condensed aqueous solution produced by the condenser 12 may be collected in a storage tank 16 and packaged as a liquid fertilizer 22.

Figure 4:
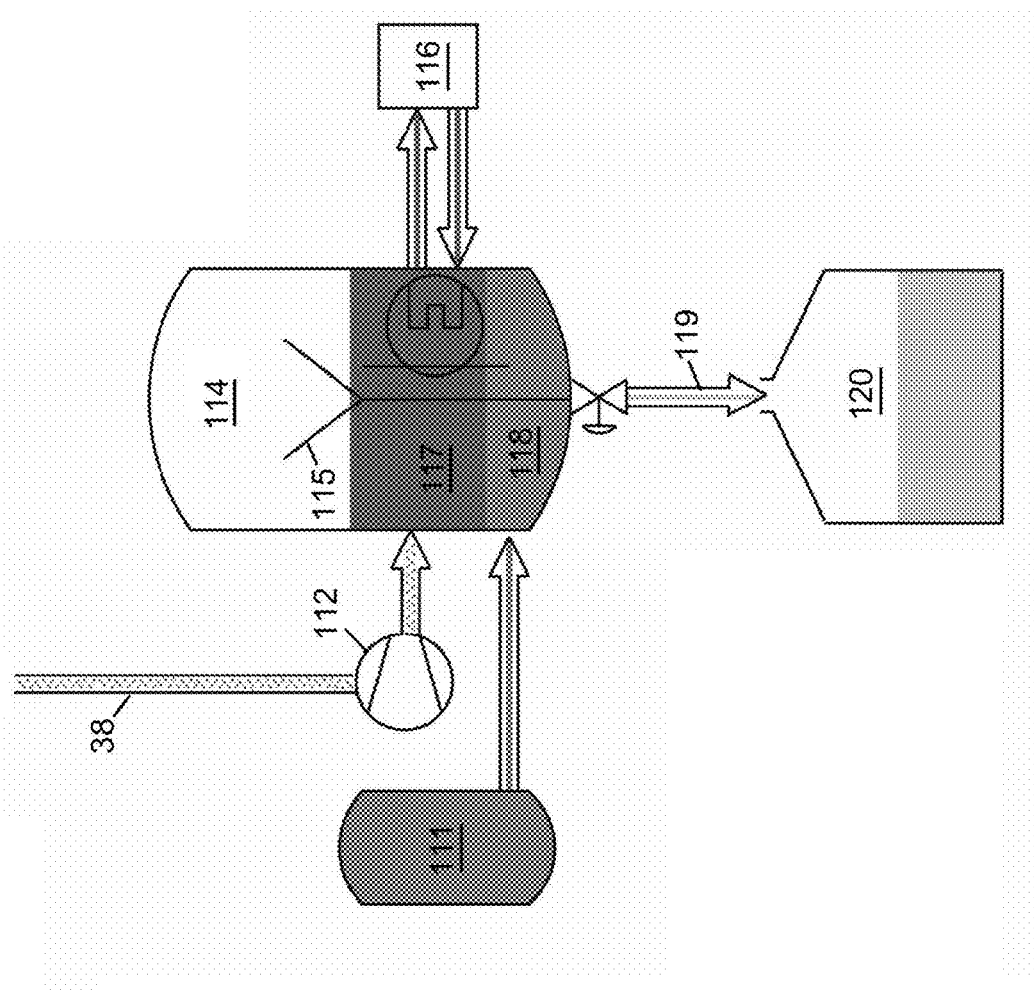
FIG. 4 schematically represents an isolated view of an alternative embodiment of the product section of the system of FIG. 2 in accordance with certain nonlimiting aspects of the invention.

FIG. 4 represents an isolated view of an alternative embodiment of the product section of the system of FIG. 2. In this embodiment, represented as a batch process, the vapor mixture transported by the conduit 38 is drawn through a compression pump 112 and delivered to a single mixing tank 114, instead of the series of tanks 17 and 19 shown in FIGS. 2 and 3. The mixing tank 114 is preferably a pressurized tank and contains a mechanical mixing mechanism 115 to mix the vapor mixture with gypsum from a gypsum source 111 and dissolved ammonium carbonate of the condensed aqueous ammoniacal nitrogen solution drawn from the condenser 12. The condensed aqueous ammoniacal nitrogen solution and gypsum are respectively represented by 117 and 118 in the tank 114. The temperature in the tank 114 is preferably 90° F. to 130° F. (about 30° C. to 55° C.), more preferably 100° F. to 120° F. (about 35° C. to 50° C.), and most preferably about 105° F. (about 40° C.). The mechanical mixing in the tank 114 is preferably maintained at about 200 RPM, preferably for a duration of 4 to 12 hours, more preferably 6 to 10 hours, and most preferably about 8 hours. The batch process is not necessarily limited to a single tank 114 and additional embodiments can include multiple vessels with mechanical mixing in each. Optionally, a water-cooled condenser 116 may be coupled to the tank 114. A stabilized product (primarily an ammonium sulfate solution) produced in the tank 114 may be removed and stored in a liquid storage tank 120, from which it may undergo further processing such as drying as described in reference to FIGS. 2 and 3.

In all embodiments of the water bath (tanks 17, 19, and 114), the resulting liquid is removed and heated to increase the concentration of ammonia and sulfur in the liquid. Although not shown, the ammonium sulfate solution can be diverted to a mechanical dryer to evaporate all the water off the product to create solid ammonium sulfate crystals using components similar to those represented in FIG. 3, which can be used as a solid ammonium sulfate fertilizer. The drying process preferably creates water vapor, which can be diverted for use in the earlier stages of the process, preferably the distillation section.

The systems and processes described above produce a liquid or solid organic fertilizer containing soluble ammoniacal nitrogen and organic sulfur. The majority of organic fertilizers currently commercially available contain relatively low levels of nitrogen in forms that are slowly released over the course of weeks or months. In contrast, the ammoniacal nitrogen in the products produced by the processes described herein is immediately available to plants/crops upon contact with the fertilizer.

The liquid fertilizer produced preferably has a pH between 4.5 and 6.5, most preferably about 5. Water is preferably present in the liquid fertilizer in an amount of at most 83.5 wt %, for example, about 67 wt % of the product. The liquid fertilizer preferably contains at least 16.5% dissolved solids, for example, about 33% dissolved solids, and may contain trace amounts of calcium carbonate, calcium sulfate (e.g., gypsum), and other mineral residues. The fertilizer is preferably free of or substantially free of pathogens, nitrates, and phosphate. The nitrogen in the liquid fertilizer is preferably in concentrations between 3.5 and 9%, more preferably 6 to 8% and, most preferably about 7%. The sulfur in the liquid fertilizer is preferably in a concentration of 4 to 10%, more preferably 7 to 9%, and most preferably about 8%. The nitrogen-to-sulfur ratio in the liquid fertilizer is preferably 7:8, that is, the nitrogen:sulfur by weight ratio of ammonium sulfate. Any nitrogen and sulfur outside of the 7:8 ratio may reflect changes in the amount of gypsum added to the ammonium carbonate/bicarbonate solution and such difference may be due to undissolved ammoniacal nitrogen remaining in the product. In certain embodiments, the liquid fertilizer may have a nitrogen-to-phosphorus-to-potassium-to-sulfur (N—P—K—S) ratio of 7:0:0:8.

The dry fertilizer produced preferably contains about 21% nitrogen and about 24% sulfur. In certain embodiments, the dry fertilizer may have a nitrogen-to-sulfur ratio of 21:24. In certain embodiments, the dry fertilizer may have a nitrogen-to-phosphorus-to-potassium-to-sulfur (N—P—K—S) ratio of 21:0:0:24. The higher nitrogen content in the dry fertilizer may lead organic certifying agents to require the fertilizer to be mixed with compost or only be used to supply 20% of a crop's nitrogen needs during a single harvest.

The fertilizer produced is preferably produced in accordance with the standards of the National Organic Program and other relevant organic certifying institutions in order for the fertilizer to be approved as an input in organic crop production.

The resulting liquid fertilizer is excellent for providing both significant levels of nitrogen and sulfur to organic crops in a single concentrated product. The fertilizer provides a more cost competitive cost-per-pound of nitrogen as opposed to other commercially available products. The nitrogen is in a water soluble form easily taken up by plants, a faster release time than nitrogen found in compost or other organic fertilizers which have nitrogen release times stretching over several weeks to even months. The sulfur in the resulting liquid fertilizer is believed to be a preferred concentration for specialty organic crops such as berries and legumes. In particular, the berry market is currently one of the fastest growing sectors of the organics industry and current limitations of organic fertilizers have increased the overhead costs of growing organic berries. An organic ammonium sulfate product such as the fertilizers disclosed herein are believed to have the potential to reduce these overhead costs and encourage innovation in the organics industry. Traditional row crops such as wheat may also benefit from the product described therein.

The fertilizer produced is concentrated and easy to transport compared to other organic fertilizers on the market including compost, feather meal, urea, and other products, reducing the carbon footprint of organic crop production. The dry fertilizer can also be mixed with current composts and other fertilizers on the market, necessitating smaller amounts of compost and other fertilizers to be transported.

Additionally, the fertilizer produced sequesters carbon in the form of calcium carbonate during the ammonium sulfate production process. The carbon sequestered would otherwise be released into the atmosphere if the effluent used in the system was disposed of otherwise. The carbon sequestered amounts to roughly 1.5 pounds (about 0.7 kg) of carbon dioxide per pound (about 0.5 kg) of nitrogen in the fertilizer. This equates to roughly 1.5 carbon credits per 3,450 gallons (about 13,060 L) of fertilizer applied. This sequestration provides for a method of environmental management on the animal feedings operations where the organic waste filtrate required by the present invention can be sourced from anaerobically digested manure.

In investigations leading to aspects of the present invention, the above-noted process was used in the production of dry ammonium sulfate using an automated 24 foot (about 7.3 m) tall distillation tower connected to a 110,000 BTU (about 116,056 kJ) boiler. Specifically, 0.3 gallons (about 1.14 L) per minute of digested dairy cow manure effluent containing 1800 ppm ammonia filtered to 15 microns was preheated to 150° F. (about 65° C.) using a heat exchanger and then further heated to 180° F. (about 80° C.) using another heat exchanger before entering the tower. The second heat exchanger used heat captured from the Bottoms exiting the distillation tower at approximately 210° F. (about 100° C.).

The 180° F. (80° C.) effluent was pumped to the distillation tower to a point 16 feet (about 4.9 m) high on the tower. The tower was a packed media distillation column with a six inch (about 15 cm) diameter in the ammonia stripping portion. Live steam from the boiler was injected into the tower at 12 to 15 psi (about 82 to about 104 kPa) above the bottoms collection tank at the base of the tower. The ammonia from the effluent was stripped in the lower 16 feet (about 4.9 m) of the tower and then concentrated in the upper 8 feet (about 2.5 m) of the tower. The concentration portion had a diameter of 6 inches (about 15 cm) at the feed line to 2 inches (about 5 cm) at the top. $CO_2$ and $H_2S$ was also stripped from the manure in the column. A mixture of ammonia, $CO_2$, $H_2S$, and water vapor exited the top of the tower as a vapor mixture. The vapor mixture exited the tower at approximately 180° F. (about 80° C.).

The concentration of the ammonia occurred using internal reflux condensation in jacketed cooling cans in the tower. Cold groundwater was run through the jacketed portions and the flow of the water was managed by control valves. The distilled vapor mixture was piped into a multistage gypsum slurry bath resulting in the production of ammonium sulfate and calcium carbonate slurry. The gypsum bath was maintained at approximately 110° F. (about 43° C.). The calcium carbonate was filtered out of the slurry resulting in an ammonium sulfate liquid. The calcium carbonate was dried resulting in a calcium carbonate cake.

Analysis of the liquid ammonium sulfate product concluded that the product contained at least 3% ammoniacal nitrogen and at least 3.4% sulfur. Lab analysis showed that there was more than an 80% ammonia removal efficiency from the effluent. A portion of the liquid ammonium sulfate product was evaporated and dried to produce dry ammonium sulfate crystals.

While the invention has been described in terms of specific embodiments, it is apparent that other forms could be adopted by one skilled in the art. For example, the physical configuration of the system could differ from that shown, and materials and processes/methods other than those noted could be used. Therefore, the scope of the invention is to be limited only by the following claims.

The invention claimed is:

1. An aqueous ammonium sulfate fertilizer having at least 3.5% nitrogen and at least 4% sulfur, and derived from an organic feedstock and a mineral sulfate compound, wherein the aqueous ammonium sulfate fertilizer contains ammoniacal nitrogen and organic sulfur.

2. The aqueous ammonium sulfate fertilizer of claim 1, wherein the aqueous ammonium sulfate fertilizer contains nitrogen and sulfur in a 7:8 ratio.

3. The aqueous ammonium sulfate fertilizer of claim 1, wherein the aqueous ammonium sulfate fertilizer contains 7% nitrogen and 8% sulfur.

4. The aqueous ammonium sulfate fertilizer of claim 1, wherein the aqueous ammonium sulfate fertilizer includes at least 16.5 wt % dissolved solids.

5. The aqueous ammonium sulfate fertilizer of claim 1, wherein the aqueous ammonium sulfate fertilizer is substantially free of pathogens.

6. The aqueous ammonium sulfate fertilizer of claim 1, wherein the aqueous ammonium sulfate fertilizer comprises at most 83.5 wt % water.

7. The aqueous ammonium sulfate fertilizer of claim 1, wherein the aqueous ammonium sulfate fertilizer meets the standards for approval as an input in organic crop production under the National Organic Program.

8. The aqueous ammonium sulfate fertilizer of claim 1, wherein the aqueous ammonium sulfate fertilizer has a N—P—K—S ratio of 7-0-0-8.

9. The aqueous ammonium sulfate fertilizer of claim 1, wherein the mineral sulfate compound includes mined gypsum (calcium sulfate).

10. The aqueous ammonium sulfate fertilizer of claim 1, wherein the mineral sulfate compound is mined Epsom salt (magnesium sulfate).

11. The aqueous ammonium sulfate fertilizer of claim 1, wherein the aqueous ammonium sulfate fertilizer contains residues of calcium carbonate, calcium sulfate, and/or other mineral additives.

12. The aqueous ammonium sulfate fertilizer of claim 1, wherein the aqueous ammonium sulfate fertilizer is produced by a process comprising the steps of:
  preparing an organic feedstock that contains at least one nitrogen compound by causing organic animal manure and/or organic food waste to undergo anaerobic digestion;
  removing solids from the organic feedstock to produce an organic liquid effluent that contains at least one of ammonium and ammonia;
  performing a distillation process on the organic liquid effluent to strip and concentrate a vapor mixture therefrom that contains ammonia, carbon dioxide, and water, and cool the vapor mixture to produce a condensed solution containing ammonium bicarbonate and/or ammonium carbonate; and
  contacting the condensed solution with the mineral sulfate compound to cause a reaction therebetween and produce an aqueous ammonium sulfate product.

13. A solid ammonium sulfate fertilizer containing about 21% nitrogen and about 24% sulfur, and derived from an organic feedstock and a mineral sulfate compound, wherein the solid ammonium sulfate fertilizer contains ammoniacal nitrogen and organic sulfur.

14. The solid ammonium sulfate fertilizer of claim 13, wherein the solid ammonium sulfate fertilizer is substantially free of pathogens.

15. The solid ammonium sulfate fertilizer of claim 13, wherein the solid ammonium sulfate fertilizer meets the standards for approval as an input in organic crop production under the National Organic Program.

16. The solid ammonium sulfate fertilizer of claim 13, wherein the solid ammonium sulfate fertilizer has a N—P—K—S ratio of 21-0-0-24.

17. The solid ammonium sulfate fertilizer of claim 13, wherein the mineral sulfate compound includes mined gypsum (calcium sulfate).

18. The solid ammonium sulfate fertilizer of claim 13, wherein the mineral sulfate compound is mined Epsom salt (magnesium sulfate).

19. The solid ammonium sulfate fertilizer of claim 13, wherein the solid ammonium sulfate fertilizer is crystalline ammonium sulfate.

20. The solid ammonium sulfate fertilizer of claim 13, wherein the solid ammonium sulfate fertilizer is produced by a process comprising the steps of:
    preparing an organic feedstock that contains at least one nitrogen compound by causing organic animal manure and/or organic food waste to undergo anaerobic digestion;
    removing solids from the organic feedstock to produce an organic liquid effluent that contains at least one of ammonium and ammonia;
    performing a distillation process on the organic liquid effluent to strip and concentrate a vapor mixture therefrom that contains ammonium bicarbonate and cool the vapor mixture to produce a condensed solution containing ammonium bicarbonate and/or ammonium carbonate;
    contacting the condensed solution with the mineral sulfate compound to cause a reaction therebetween and produce an aqueous ammonium sulfate product; and
    performing an evaporation process on the aqueous ammonium sulfate product to remove water therefrom and produce a dry, solid ammonium sulfate product.

* * * * *